Jan. 4, 1927.  H. DICK  1,612,968
TWO-STROKE CYCLE MOTOR
Filed March 6, 1926
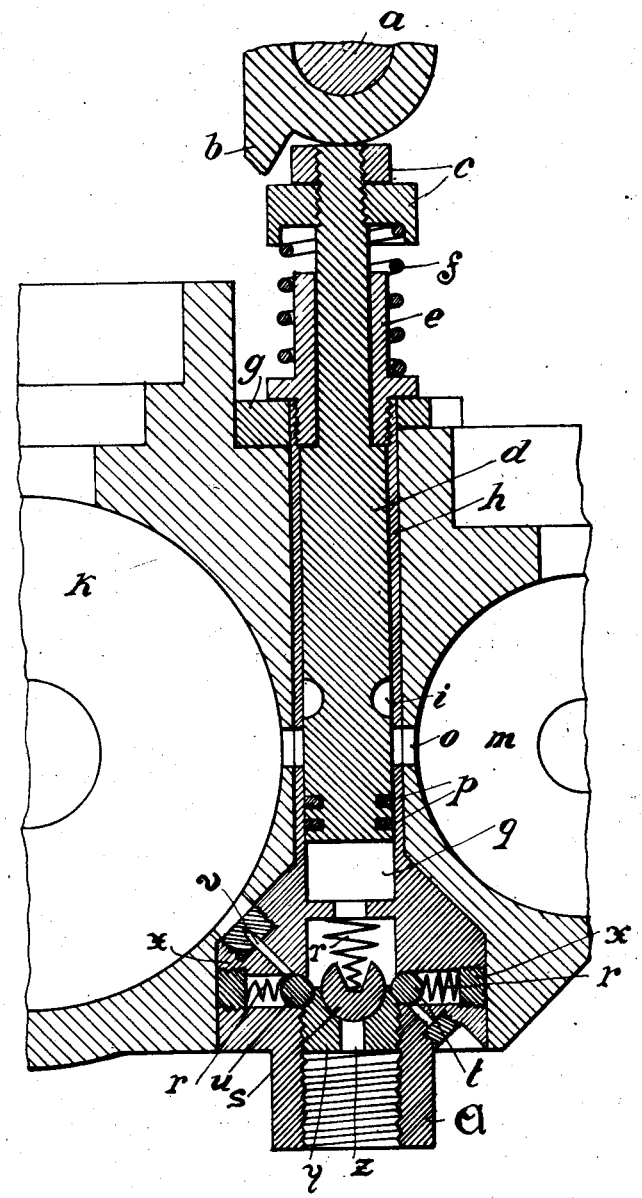
Inventor
Hermann Dick Patented Jan. 4, 1927.

1,612,968

UNITED STATES PATENT OFFICE.

HERMANN DICK, OF ROSEBURG, GERMANY.

TWO-STROKE-CYCLE MOTOR.

Application filed March 6, 1926, Serial No. 92,972, and in Germany July 7, 1924.

There are already known two-stroke cycle motors working with separate introduction of the air and the fuel, with an excess of the fuel, and with returning of the respective excess. The devices employed for this purpose, in so far pumps are concerned, are not, however, so designed as to be able to serve also as control slides adapted to supply the cylinder or cylinders with that amount of compressed air necessary for the formation of a proper explosive mixture. Either the working piston must suck the air required for the formation of the explosive mixture from below through the crank casing, or that air must be supplied by a separate feed pump having a separate slide provided especially for that purpose.

Now, the present invention relates to a two-stroke cycle motor combined with a fuel pump so designed that, besides supplying the fuel, it is also able to act as a control slide for the compressed air to be mixed with the fuel. Instead of showing in the drawing the complete motor with all its accessories I have deemed it sufficient to show only that arrangement and combination of parts constituting the invention, and this arrangement and combination is shown in longitudinal section.

On the drawing, $a$ denotes a cam shaft which is rotated continuously by the motor. It may be assumed that the motor be a double-acting two-stroke motor combined with a double-acting compressor, the piston of which is in advance of the working piston by one sixteenth of a revolution.

The cam $b$ of the shaft $a$ actuates the plunger $d$ of the fuel pump $d\ h$ by the intermediary of nuts $c$ screwed upon the free end of said plunger or, more precisely, of the projecting rod of the same which is guided in a socket $e$ encompassed by a helical compression spring $f$ bearing at one end against a flange of said socket and at the other end against the lower and larger of the two nuts $c$. The plunger $d$ is depressed intermittently by the cam $b$, and the spring $f$ is compressed at the same time, and when the cam leaves the upper nut $c$ the plunger is thrown upwards suddenly by the spring.

The socket $e$ bears upon an annulus $g$ encompassing the upper end of the cylinder $h$. The walls of the working cylinder $k$ and of the compressor $m$ are provided with ports $o$ communicating with apertures of the cylinder $h$, and the piston is provided with a circumferential groove $i$ by which the ports $o$ are being brought into communication with each other when the plunger has been depressed, the compressed air flowing then from the compressor into the working cylinder. $p$ denotes the packing rings of the plunger, $q$ the suction space of the cylinder, $r$ a helical spring bearing at its upper end on a partition wall having a central bore, and at its lower end on the fuel suction valve $s$, $y$ is the seat of or for this valve which is provided with a passage $z$. The cylinder $h$ or, more precisely, its wall is greatly enlarged at its lower end where it forms a conical body having two diagonally located bores closed at its outer ends by threaded insertions $x$ $x$ and enclosing at its inner ends balls $u$ and $t$ forming valves pressed on their seats by helical springs $r$ $r$. $v$ denotes a nozzle, or nozzle-valve respectively.

The manner of operation of the device is as follows:

Supposing, the piston of the compressor be shortly before its dead centre position, then the plunger $d$ will be depressed by the cam $b$ and the groove $i$ will establish a communication between the compressor cylinder and the working cylinder, in consequence whereof the compressed air will flow from $m$ to $k$. Simultaneously with the depression of the plunger, the fuel contained in the chamber below the plunger will be forced into the working cylinder through the nozzle $v$ until the pressure in the working cylinder is the same as that in said chamber. The other part of the fuel is forced away through the ball valve $t$ to the fuel tank. When the plunger has arrived in its lowermost position, the valve is closed again by the appertaining spring $r$. The valve $u$ had been closed already prior thereto by its appertaining spring, viz, at that point of time when the pressures exerted on one side by the fuel and on the other side by the compressed air were equal.

Owing to the shape of the cam $b$ the plunger $d$ returns, under the pressure of the spring $f$, into its former position not gradually, but suddenly, and simultaneously therewith the communication between the cylinders $m$ and $k$ is interrupted and fresh fuel is sucked into the chamber below the plunger. The compressed air contained in the cylinder $k$ is now enclosed therein, as is also the fuel injected into this cylinder, or into that compressed air respectively, through the nozzle $v$, the working piston being, at this point of time, shortly before its dead centre.

Just in this moment the sparking plug causes the ignition and explosion of the mixture, which burns while the working piston passes through its dead centre.

The working piston is now being driven forward and the compressor piston sucks another amount of air into the compressor, whereas, at the same time, the air present on the other side of this piston is compressed.

The suction valves are opened by the pressure of the atmosphere, and closed by the internal pressure plus the pressure of a spring having an over pressure of, say, one fourth of the atmosphere.

In the case of a double-acting two-stroke motor, as assumed in the drawing, it is, of course, necessary to provide two fuel pumps suited to operate also as control valves; besides, two exhaust valves must be provided for the working cylinder, and two suction valves for the compressor.

When the working piston has covered seven eighths of its path, the exhaust valve in front of it which had been open up to the respective point of time is being closed, and the other fuel pump commences to work exactly in the manner described in the preceding paragraphs with respect to the pump shown. When then the working piston has arrived in its dead-centre position, the other exhaust valve is being opened by the means provided therefor (not shown) and the gases are permitted to escape.

I claim:

A two-stroke cycle motor, comprising, in combination with the working cylinder and the compressor cylinder, a fuel pump so designed as to be adapted to serve also as control slide for the compressed air on its path from the compressor cylinder to the working cylinder, substantially as set forth.

HERMANN DICK.